INVENTOR.
CLELL A. DILDY, JR.

United States Patent Office 3,344,421
Patented Sept. 26, 1967

3,344,421
DIGITALLY CONTROLLED AUTOMATIC RANGE GATE
Clell A. Dildy, Jr., Panama City, Fla., assignor to the United States of America as represented by the Secretary of the Navy
Filed Feb. 25, 1966, Ser. No. 531,651
2 Claims. (Cl. 343—7.3)

ABSTRACT OF THE DISCLOSURE

An automatic tracking range gate that is controlled by the last known digital range of a sonar target. A digital counter is started by a sonar transmitted pulse and is stopped by a received target echo pulse which passes through a range gate under the control of a backward counter, the latter of which has already stored previously determined target range information in digital form. Just prior to the sonar transmitted pulse, the range value on the digital counter is transferred to a range indicator, and also to said backward counter for generating the next gating signal. Thus, for any change in target range, the backward counter is reset to such new range.

---

The invention described herein may be manufactured and used by or for the Government of the United States of America for governmental purposes without the payment of any royalties thereon or therefor.

This invention relates to radiated-signal reflector ranging systems and more particularly to an improved digital range tracking circuit utilizing a backward counter to provide a range gate signal.

An object of the invention is the provision of an automatic tracking range gate that is controlled by the last known digital range of a rader or sonar target.

Another object of the invention is to provide a range tracking circuit requiring very few components.

A further object of the invention is to provide a tracking circuit requiring very few components.

A further object of the invention is to provide a tracking circuit which at all times displays in a digital register the last range reading.

The preferred embodiment of the invention to be described in detail is one specially designed for modifying the range readout system described in Patent No. 3,181,-154, issued to Alfred M. Henne. In accordance with the invention during the target acquisition mode a transmitted pulse starts a digital counter which, after initial selection of a target by its video signal as by a light sensitive probe, e.g., as shown by Henne, stops with the range in digital form in the counter and also is transferred to a range register. After a target has been selected (acquired) the system is switched to the tracking mode wherein the next transmitted pulse resets the range counter and transfers the count from the range register to a backward counter whereby both the range counter and the backward counter are started. When the backward counter reaches a preselected count above zero it generates a pulse to open a range gate for an interval of time such as, for example, the time required for the backward counter to pass through zero and reach a count numerically equal to said preselected count at which time it ceases counting. If a video signal is received while the range gate is open it stops the range counter and transfers the range count to the range register. If no video signal is received while the range gate is open then the value in the range register remains unchanged and the position of the range gate remains the same. If the target has moved, the range gate will be opened at a time corresponding to the new range.

Figure 1:
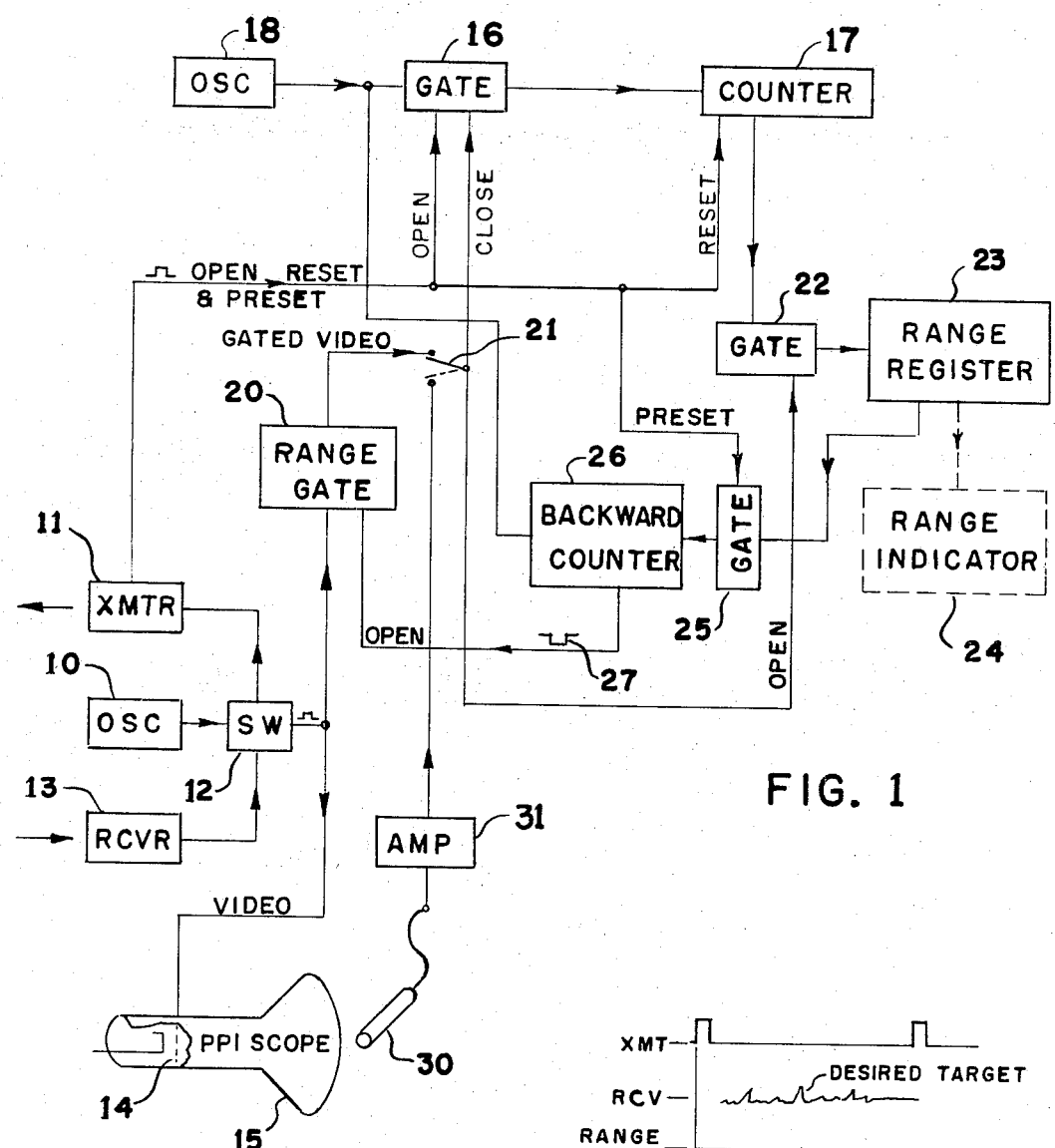
Figure 2:
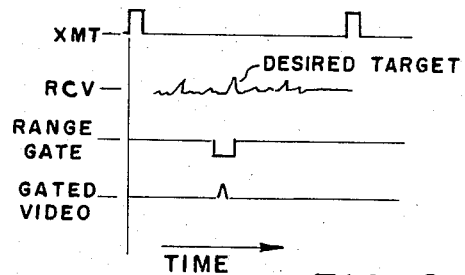

For a better understanding of the invention, together with further objects thereof, reference is had to the following description taken in connection with the accompanying drawing wherein:

FIG. 1 is a block diagram of an echo ranging system incorporating a digital tracking circuit in accordance with the invention, and FIG. 2 is a graph utilized in explaining the operation of the system in accordance with the invention.

As shown in FIG. 1, an oscillator 10 is adapted to periodically energize a transmitting transducer 11 as controlled by a TR switch 12 is a well known manner. Reflected energy from a target is picked up by a receiver 13 and fed as a video signal into the intensity control grid 14 of a suitable display tube 15 which ordinarily is equipped with deflection circuits (not shown) for providing a PPI type display. The transmitter 11, each time it is energized, delivers an open and reset pulse to a gate 16 and a counter 17, respectively, to open the gate 16 and to reset the counter 17. The opening of the gate 16 connects the counter 17 to a fixed frequency oscillator 18. The video signal from the receiver 13 is also passed through a range gate 20 (if it is open) and a normally closed switch 21 to close the gate 16 and thereby stop the counter 17. This gated video signal passing through the range gate 20 is also utilized to enable another gate 22 to transfer the count on the counter 17 to a range register 23. The range register 23 may itself display the count contained therein or alternatively it may be simultaneously displayed by a range indicator 24, here shown by broken lines. The next time the transmitter 11 is energized, the gate 16 is again opened and the counter 17 reset to begin counting anew. The same pulse which opens the gate 16 also presets or enables another gate 25 which transfers the count on the range register 23 to a backward counter 26 which is connected to the oscillator 18 and immediately starts counting backwards from the newly inserted count until at some preselected count ordinarily above zero it generates a pulse 27 to open the range gate 20. It is thus apparent that the backward counter 26 functions as a range gate generator. The length of the pulse 27 which determines the time interval that the range gate 20 remains open may correspond to the time interval required for the backward counter 26 to count down from the preselected count, through zero and reach a count numerically equal to said preselected count at which time it ceases counting. If a video signal is generated by the receiver 13 while the range gate 20 is open, it passes through the range gate 20 to repeat the foregoing operation, viz., closes the gate 16 and opens the gate 22. If no video signal is present during the interval the range gate 20 is open, the count on the range register 23 remains unchanged.

Initial acquisition of a target desired to be automatically tracked may be attained in any well known way but is preferably accomplished by utilizing the technique disclosed in the above identified Henne patent wherein a light sensitive probe 30 is placed on the face of the tube 15 over the brightened spot representing said desired target and with the switch 21 moved to the position indicated by a broken line. The resulting video pulse generated by the probe 30 is passed through an amplifier 31 and the switch 21 to close the gate 16 and open the gate 22. Switch 21 is then permitted to move to its normal position to place the system in the automatic tracking mode. It will be understood that in practice the switch 21 will, for convenience, preferably be located on the probe 30 for easy switching to the acquisition mode when a target is to be acquired. From an inspection of FIG. 2, it will be evident that only a signal received from a target during the time the range gate is open will permit a gated video signal and hence only the desired target within the range determined by the range gate will be automatically tracked.

While for the purpose of disclosing the invention only the presently preferred embodiment thereof has been disclosed in detail so as to enable those skilled in the art to practice the invention, it is to be understood that the invention is not limited thereto but includes those changes and modifications which do not depart from the spirit and scope of the invention as set forth in the appended claims. As an example of an obvious modification, the length and timing of the range gating pulse 27 need not be "symmetrical" with respect to the zero count on the backward counter 26 and should not be in those cases where it is known that the target is rapidly changing in range. Thus, for a rapidly approaching target, the gating pulse 27 may begin at a high initial count on the way down and terminate at or about zero count.

What is claimed is:

1. A digitally controlled automatic range tracking circuit for a pulse echo ranging system in which video pulses returned from a desired target are selectively gated to stop a range counter comprising
   a first gate,
   a fixed frequency oscillator connectable through said first gate to said range counter,
   a range register,
   a second gate when enabled for transferring to said range register the count on said range counter,
   a backward counter,
   a third gate when enabled for transferring the count on said range register to the backward counter,
   means for simultaneously transmitting a pulse toward a target, resetting said range counter, opening said first gate and enabling said third gate,
   a range gate for passing video pulses to close said first gate and enable said second gate, and
   said backward counter being operative for opening said range gate during the interval of time said backward counter counts through zero from one preselected count to another preselected count whereby only video pulses from targets which differ in range from the range transferred to said backward counter by no more than a predetermined value are gated.

2. A tracking circuit according to claim 1 including means for acquiring a target to be tracked comprising
   means controlled by an operator for exclusively closing said first gate by a video pulse selected by the operator.

References Cited
UNITED STATES PATENTS

| | | | |
|---|---|---|---|
| 3,012,721 | 12/1961 | Fiske | 343—7.3 X |
| 3,035,263 | 5/1962 | Lader et al. | 343—7.3 |
| 3,217,320 | 11/1965 | Perry et al. | 343—7.3 |
| 3,246,324 | 4/1966 | Price | 343—7.3 |
| 3,267,464 | 8/1966 | Shames | 343—7.3 |

RODNEY D. BENNETT, *Primary Examiner.*

C. L. WHITHAM, *Assistant Examiner.*